United States Patent

[11] 3,610,711

[72] Inventor George M. Mierley, Sr.
Wilmington, Del.
[21] Appl. No. 28,606
[22] Filed Apr. 15, 1970
[45] Patented Oct. 5, 1971
[73] Assignee Westinghouse Electric Corporation
Pittsburgh, Pa.

[54] TILTING PAD BEARING AND SEAL
6 Claims, 4 Drawing Figs.
[52] U.S. Cl. .................................................. 308/73,
308/36.3, 277/75
[51] Int. Cl. ...................................................... F16c 17/06,
F16c 33/78
[50] Field of Search ........................................ 308/72, 73,
140

[56] References Cited
UNITED STATES PATENTS
3,022,123  2/1962  Gruber .......................... 308/73
3,337,276  8/1967  Cherubim ...................... 308/73
3,339,990  9/1967  Wendt ........................... 308/73

Primary Examiner—Martin P. Schwadron
Assistant Examiner—Barry Grossman
Attorneys—A. T. Stratton, F. P. Lyle and F. Cristiano, Jr.

ABSTRACT: The invention relates to a tilting pad bearing and seal for use in the housing of a turbine shaft or in other similar apparatus. The tilting pad bearing comprises a plurality of cylindrical pads or segments disposed in a housing in pivotable abutment with a key having a convex outer surface in the form of a cylindrical segment which makes line contact with the inner surface of the housing parallel to the axis of said shaft so as to compensate for irregularities in a radial plane.

The key has also a convex surface in the form of a cylindrical segment radially inwardly of the outer surface and which makes line contact with a flat surface on the bearing segment in a direction at right angles to the line of contact with the housing.

The key projects through an opening in a bearing shell located close to the inner surface of the housing into direct contact with the inner surface of the housing.

A balanced seal ring structure is provided having seal ring segments engaging the shell and having orifices through which high-pressure fluid is conducted to the low-pressure zone to balance the forces applied to the sides of the ring segments to make them free floating.

TILTING PAD BEARING AND SEAL

BACKGROUND OF THE INVENTION

An outstanding disadvantage of tilting pad bearings used in the past has been that they have required considerable height radially for accommodating the various component elements, which necessitated a housing of considerably large diameter, as well as hardened bearing elements to withstand the very high pressures from point contact, such as in the use of spherical bearing elements.

Such tilting pad bearings are provided with babbitt metal bearing surfaces, and are particularly useful in rotatably supporting turbine shafts and the like. However, a common fault of the sealing ring in the bearing shell has been the tendency for the sealing ring to bind against the shell surface by larger forces from the high-pressure zone, leading to development of abnormal pressures on the babbitt surfaces surrounding the shaft.

BRIEF SUMMARY OF THE PRESENT INVENTION

An object of the present invention is to overcome the disadvantages of commonly used tilting pad bearing and seal structures by providing a relatively inexpensive tilting pad bearing combination which enables the housing to be considerably smaller in diameter, therefore, the apparatus to be much more compact than prior apparatus.

A further object of the invention is to provide a balanced seal ring which will overcome the tendency of the sidewalls of the ring to bind against the bearing shell and impose high frictional stresses on the babbitt surfaces.

The tilting pad bearing construction of this invention involves a novel key having an outer cylindrical surface segment which provides direct line contact with the inner surface of the surrounding housing and which key has a cylindrical inner surface segment providing line contact with a flat surface, at right angles to the aforesaid line contact. Such bearing construction enables the bearing shoes to tilt slightly in an axial plane to compensate for shaft deflections and the like, and to tilt in a radial plane to compensate for changes in oil film thickness about the perimeter of the shaft. Since the key projects through an opening in the bearing shell and makes line contact directly with the inner surface of the housing, the radius of the housing is considerably reduced and the apparatus is made more compact.

The seal ring segments have orifices interconnecting the high-pressure and low-pressure zones to provide a balanced pressure on the sides of the seal ring to prevent binding to the bearing shell due to abnormal pressures.

THE DRAWINGS

The invention along with the objects and advantages thereof will be best understood from the following detailed description taken in connection with the accompanying drawings, in which.

Figure 1:
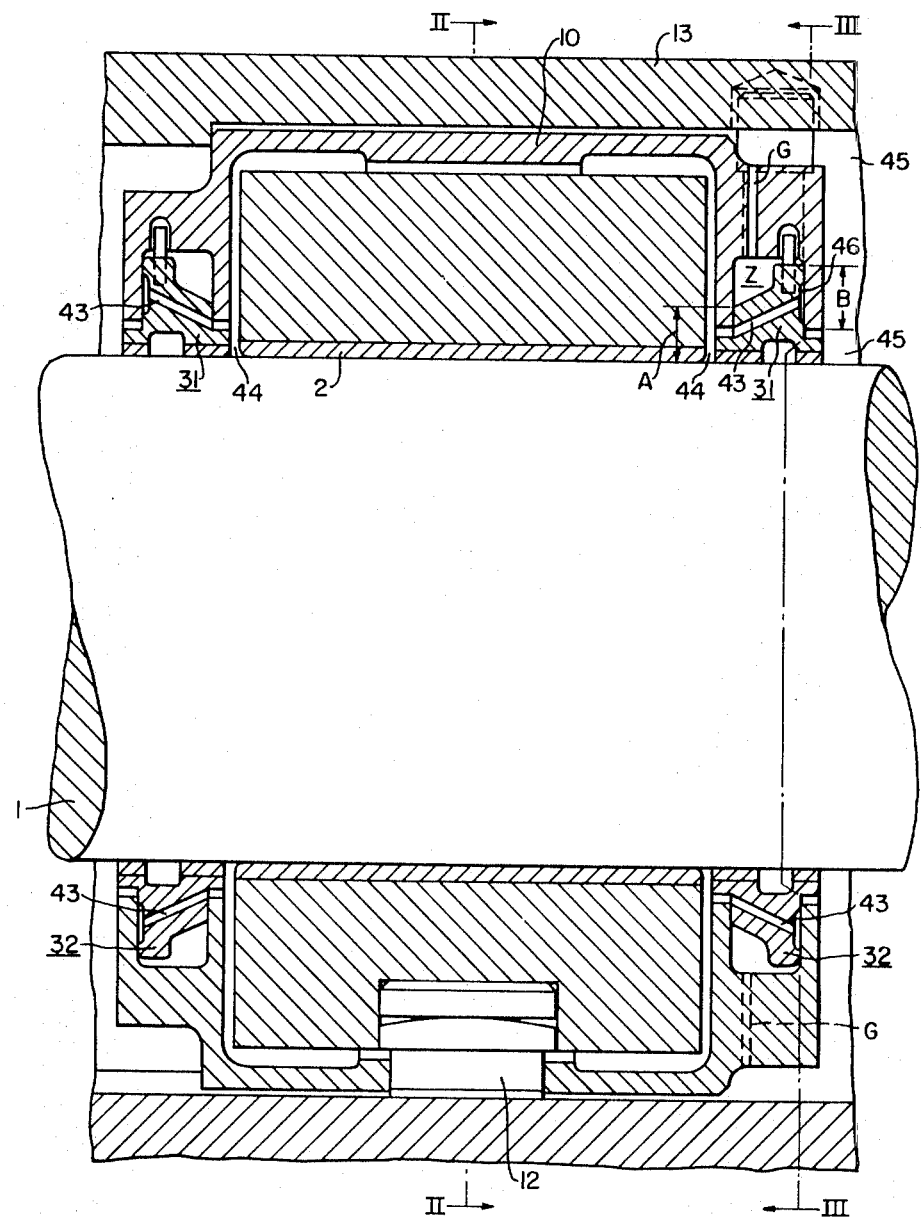
FIG. 1 is an axial sectional view of a bearing and seal structure embodying the invention the view being taken along line I—I of FIG. 3.
Figure 2:
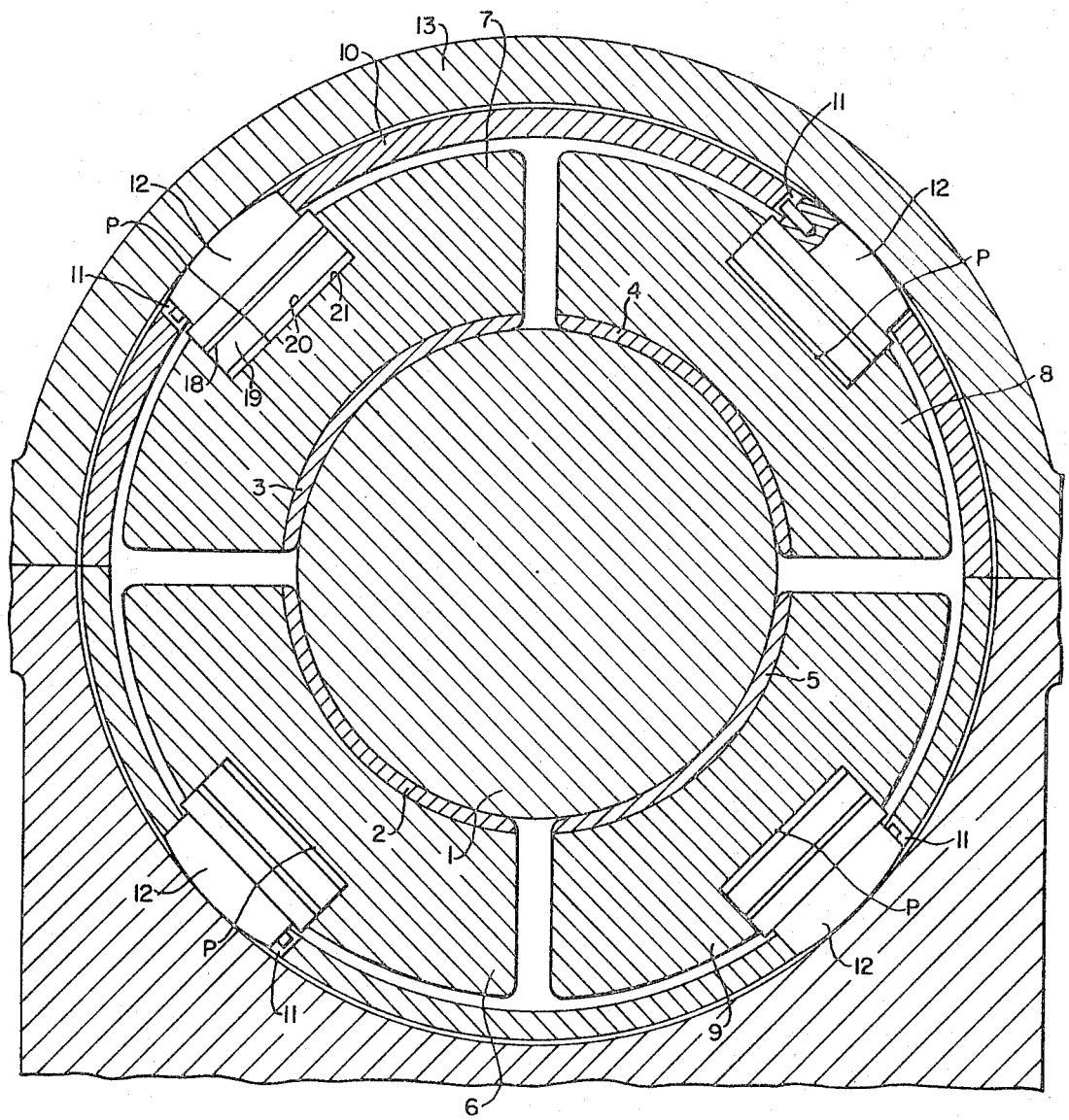
FIG. 2 is a cross-sectional view taken along line II—II of FIG. 1.

Referring more particularly to the drawings, FIGS. 1 and 2 show a turbine shaft 1 which rotates about its axis and is closely surrounded by an annular array of cylindrical pads or segments, 6, 7, 8 and 9, respectively. The pads may be babbitted steel, carbon, brass, bronze, that is, they may be provided with bearing surface portions 2, 3, 4 and 5 of babbitt metal for slidably supporting the shaft 1.

Surrounding the pads is an annular bearing shell 10 provided with a plurality of spaced circular openings 11 at evenly spaced intervals along the perimeter of the bearing shell. Each of the pads 7, 8, 9 and 10 is provided with a cylindrical pocket P. Projecting through each opening, is a tilting pad bearing key 12 received in a pocket P and of the configuration substantially of a cylindrical element and having, in the plane of FIG. 2, a radius which is somewhat smaller than the radius of the inside bore of the housing 13 which surrounds the bearing shell. The key makes direct contact with the bore or inner surface of housing 13. Thus if there is an oil film thickness between the babbitt bearing portions 2, 3, 4 and 5 and shaft 1 which is unequal throughout the perimeter of the shaft, the key will tilt slightly on the inner surface of the housing 13 and in the radial plane of FIG. 2. Since the pressure is distributed over an entire line of contact, as compared to a point contact for commonly used tiltable pad spherical bearings, low-pressure stresses result, therefore there is no need for providing a hardened bearing surface in the bore of housing 13.

Figure 4:
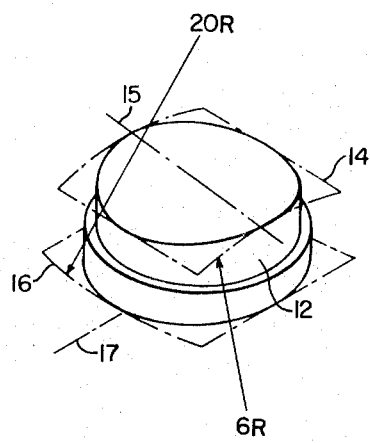

FIG. 4 more clearly shows the construction of the key 12. The top surface of key 12 is convex and follows the configuration of a segment of a cylinder, shown in dash and dot outline 14. Therefore, line contact will be made by the key along line 15 with the bore or inner surface of the housing 13, permitting rocking or tilting of the key in a radial plane, as viewed from the lower right-hand corner of FIG. 4 and in FIG. 2. The radius 6R exemplifies an outer key surface which is curved through a radius of 6 inches, for example. This would be less than the radius of the housing 13 to enable tilting of the key.

As will appear more clearly in FIG. 4, the lower surface of key 12 is also a convex segment of a cylindrical surface, following the outline indicated by dash and dot lines 16 which show that line contact is made along line 17 with the flat surface 18 of hardened disc 19 which has flat surfaces 20 and 21. The radius of the cylindrical surface segment, outlined by numeral 16, may be identified, for example by the radius 20R having a center radially outwardly of the housing, indicating a 20 inch radius, by way of example. It will be particularly noted that the line contact 15 made by the outer surface of key 12 with housing 13 extends at right angles to the line of contact 17 made by the bottom surface of the key 12 against the flat surface 15. Thus the top surface of key 12 will rest directly against housing 13 and tilt in either direction as a consequence, for example, of unevenness of the thickness of the oil film along the perimeter of the shaft, particularly since the thickness tends to be greater at the oil inlet end as compared to the oil outlet end.

On the other hand if the shaft flexes in an axial plane, as would be the case of a long shaft, the key 12 will tend to compensate for it by rocking about line contact 17 against the flat surface 18. Such tilting also compensates for displacements due to tolerance buildup.

In short, the key 12 provides universal movement in that it can compensate for distortions or irregularities both in a radial plane and in an axial plane.

Figure 3:
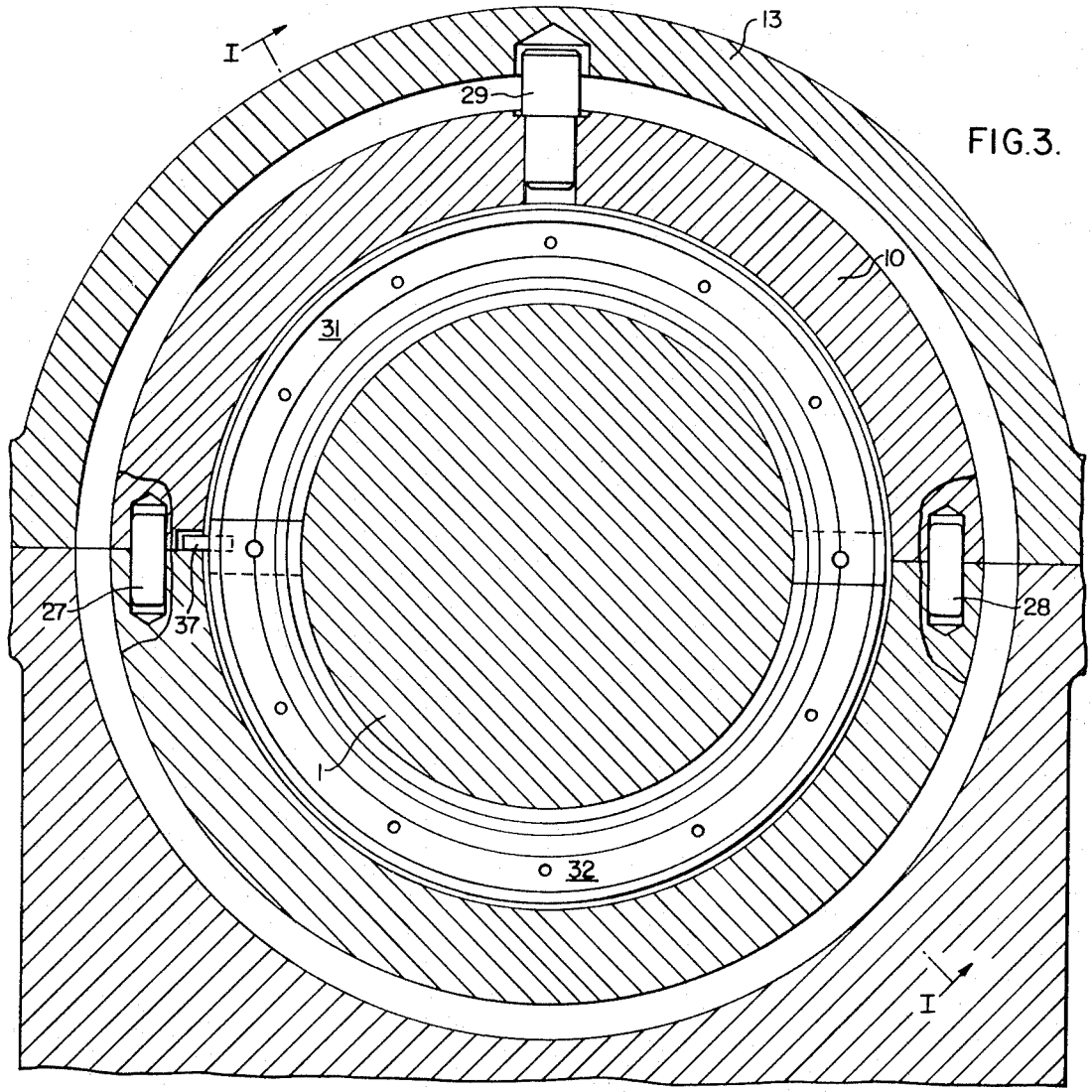
FIG. 3 is a cross-sectional view through the seal ring structure, taken along line III—III of FIG. 1; and, FIG. 4 is a perspective view of one of the tilting pad bearing elements shown in FIGS. 1 and 2.

FIG. 3 more clearly shows the segmented construction of the sealing ring contained within the bearing shell 10. The lower semicircular portion of the bearing shell 10 is provided with keys 27 and 28 for keying it to the upper semicylindrical portion of the bearing shell 11, the latter of which is restrained from rotating with respect to the housing 13 by means of a key 29.

As will appear more clearly in FIG. 1, both ends of the bearing shell surround a sealing ring formed in halves 31 and having a pin 37 which projects into an opening formed in the bearing shell end portions, as will appear more clearly in FIG. 3.

In each sealing ring half, such as 32, there are provided orifices, such as 43, which connect the high-pressure zone 44 with the low-pressure zone 45. The area of the annular portion A is smaller than the annular portion B to such a degree that the high-pressure fluid exerted against area A forces the ring segment 32 to the right, as viewed in FIG. 1, against a surface of bearing shell 10.

The seal groove cavity Z in the bearing shell 10 is vented through holes G to the low-pressure zone 45 so as to enable the pressure on annular portion B to be sufficient to oppose the pressure on the annular portion A.

The small orifice 43 allows high-pressure fluid to fill the annular cavity 46 and build up sufficiently high pressure to balance the force exerted on area A. A further increase in pressure causes the ring segment 32 to move away from contacting relationship with the bearing shell, allowing fluid flowing through the orifice 43 to escape to the low pressure on the sides thereof and is free floating, therefore binding contact with the bearing shell is avoided which would result in abnormally high pressure on the babbitt.

It will be readily apparent to those skilled in the art that such balanced ring can be used not only in turbines, such as steam and gas turbines, but in other applications, such as with thrust bearing cages, hydraulic governor seals, or for any application where the seal must easily move radially to compensate for eccentricities between a rotating shaft and a stationary housing. It may also be used between stationary and reciprocating members.

Thus it will be seen that the present invention provides a relatively simple and inexpensive tilting pad bearing construction for use in turbines and other applications, which is especially useful in applications where radial space of the housing is limited, since it enables compactness and a much smaller diameter housing than heretofore possible. Also there is provided a balanced seal ring, in the bearing shell, which avoids binding of the ring against the shell and resultant abnormal pressures on the babbitt as a consequence, for example, of eccentricity in the rotation of the shaft. Furthermore, the novel tilting pad bearing may be used to compensate in any apparatus having a rotor in a stationary housing which develops irregularities requiring compensation in both radial and axial planes.

I claim as my invention:

1. In apparatus comprising a rotatable shaft, an annular array of tilting pad bearing members closely surrounding said shaft and a stationary housing surrounding said tilting pad bearing members, in combination;
    means for tiltably supporting said pad bearing members in said housing comprising a key having a radially outward surface of the shape of a cylindrical segment having a slightly less radius than that of said housing and bearing against the inner surface of said housing with line contact, a radially inward surface of said key of the shape of a cylindrical segment having line contact with a flat bearing surface on said pad bearing members at right angles to the aforesaid line contact, whereby irregularities are compensated for in both axial and radial planes.

2. Apparatus as recited in claim 1 together with a bearing shell located between said tilting pad bearing members and said housing and provided with spaced openings about the perimeter thereof through which said key extends so as to directly contact the inner surface of said housing.

3. Apparatus as recited in claim 1 wherein said key has sidewalls of substantially cylindrical configuration.

4. Apparatus as recited in claim 1 together with a flat disc-shaped bearing element seated in a pocket formed in said pads for providing said flat bearing surface for directly supporting said radially inward surface of said key.

5. Apparatus as recited in claim 2 wherein said radially outward surface of said key is in a radial plane and wherein said radially inward surface of said key is in an axial plane.

6. Apparatus as recited in claim 1 wherein said tilting pad means comprises a plurality of pads disposed about the periphery of said shaft, and wherein said pocket means comprises a pocket in each of said pads, and wherein a plurality of said keys is provided, one in each of said pockets.